March 8, 1966 L. L. SMITH ETAL 3,238,862
ROOF VENTILATOR
Filed Aug. 7, 1963

INVENTOR.
Lester L. Smith
Frank E. Randall
By: Horton, Davis, Brewer & Brugman
Attys.

# United States Patent Office 3,238,862
Patented Mar. 8, 1966

3,238,862
ROOF VENTILATOR
Lester L. Smith, P.O. Box 68, Peoria, Ill., and Frank E. Randall, Peoria, Ill.; said Randall assignor to said Smith
Filed Aug. 7, 1963, Ser. No. 300,453
12 Claims. (Cl. 98—42)

This invention relates to ventilators which are designed to mount directly upon a roof whether the roof is sloped, i.e., pitched, or flat.

In my co-pending application Serial No. 253,671 for Roof Ridge Ventilator, filed January 24, 1963, now Pat. No. 3,185,070, I describe a ventilator which incorporates a baffle located in front of the opening between the base plate for the ventilator and its cover to create a negative pressure area between the baffle and ventilator, with respect to the prevailing atmospheric pressure to induce air flow out of the ventilator under conditions which otherwise would not be conducive to such flow. The design of ventilator therein described is of the roof ridge type and hence the baffle is a straight sheet of metal running parallel with the roof ridge and presenting a barrier to a natural air current which flows predominantly transversely of the roof ridge. It is progressively less effective as the direction of the air current approaches parallelity with the roof ridge.

Ventilators may take other forms, particularly where the ventilator is to be applied directly to a roof area other than to a roof ridge and which area may be either horizontal or pitched. Whatever form a ventilator may take, it is desirable to incorporate therein the negative pressure producing baffle, and hence, it is an object of this invention to provide a roof ventilator incorporating the baffle principle wherein the baffle is so constructed as to be effective to produce a negative pressure at the ventilator regardless of wind direction.

Inasmuch as a baffle presents an obstruction to the flow of rain down a pitched roof past the ventilator, it is a further object of this invention to provide a baffled ventilator wherein flow of water past the ventilator is unimpeded by the baffle and yet is not directed into the ventilator.

A feature of this invention is the provision of adequate protection in a ventilator against insects and the weather with the use of a louvered screen in which the louvers are directed outwardly and upwardly rather than downwardly.

It is a further object of this invention to provide a roof ventilator which, with the exception of a louvered screen, may be made entirely of a plastic material and hence may be molded to achieve the greatest economy of manufacture, as well as the optimum shape for the creation of a negative pressure area at the ventilator.

These and other objects and features of this invention will become apparent from the following detailed description when taken together with the accompanying drawings depicting the best mode of carrying out this invention, in which—

The novel ventilator to be described hereinafter is constructed in a manner to take advantage of the principle described in my aforesaid co-pending application S.N. 253,671, according to which a stream of air moving along a surface creates a negative pressure at that surface when it is deflected away from the surface by an obstruction in the path of the moving stream. Thus, in the present design, the ventilator is so constructed that when it is mounted on a roof and a stream of air moves parallel with the general plane of the roof against the ventilator, the stream will be deflected away from the roof to create an area of negative pressure within the ventilator which is utilized to move a greater volume of air through the ventilator than would otherwise be possible.

Figure 1:
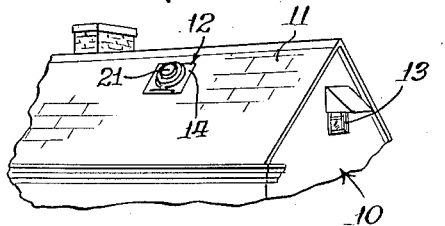
FIG. 1 is a fragmentary perspective view of a home to the pitched roof of which the ventilator of the present invention has been applied.

Referring now to the drawings for a detailed description of a preferred embodiment selected to illustrate this invention and particularly to FIG. 1, there is shown a dwelling 10 constructed to have a roof 11 which is pitched with respect to the horizontal. The pitched roof design creates an attic which may or may not be occupied and in which air circulation from the outside is a minimum because of the minimal windows normally provided for such portions of a house. The heat of the sun's rays is transmitted through the roof to the air in the attic, and because of the insufficient movement of air through the attic from the exterior of the dwelling said air becomes excessively hot. The heat of the air is then transmitted through the floor of the attic to the living quarters of the dwelling in the floor below the attic.

To promote circulation of cool air from the exterior of the dwelling through the attic region thereof, a ventilator of the form hereinafter to be described in detail and shown in general outline at 12, is applied over an appropriate opening formed for this purpose in the roof 11. It is contemplated that the dwelling will be constructed with at least one window 13 located in either the front or rear vertical walls defining the attic region so that when the window is open, a circulation of air may be established from the exterior through the open window into the attic region and then out through ventilator 12. It is contemplated further that such ventilation or air movement through the attic region will be established without the aid of a motor driven fan or the like, but will be created solely by natural convection currents either created or augmented by air moving exteriorly of the dwelling along the roof 11.

Figure 3:
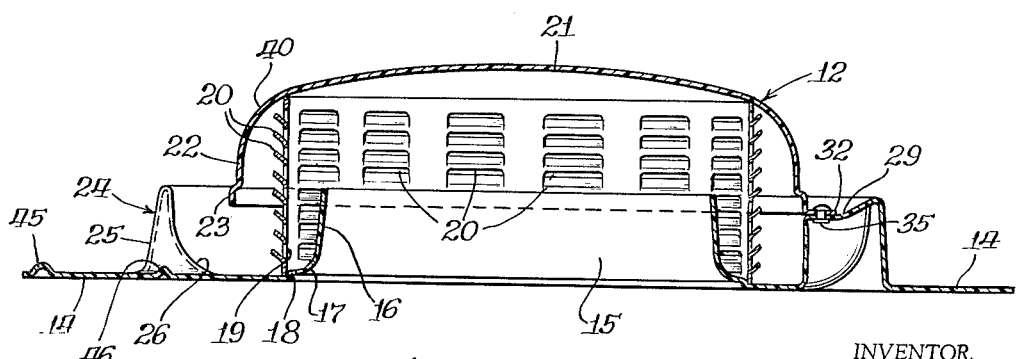
FIG. 3 is a cross-section on an enlarged scale taken through the ventilator of FIG. 2 along line 3—3 of that figure.

The ventilator 12 by which the augmentation or creation of an air flow from the attic space to the exterior of the roof is effected is shown in cross-section in FIG. 3. In that figure ventilator 12 is shown as comprising a base sheet 14 of generally flat rectangular form, by which the ventilator may be secured to the roof 11 over an appropriate opening therein as aforesaid. Said base sheet has a generally centrally located opening 15 therein which is defined by an upwardly extending flange 16 connected by a radius 17 to a circular shoulder 18 extending upwardly directly from the plane of base sheet 14. Around flange 16, and centered on shoulder 18, is a cylindrical louver-containing sheet 19 preferably made of aluminum or other similar rust-free material. Said louver-containing sheet 19 may be formed initially from a rectangular flat sheet which is then subjected to a slitting and forming operation in a suitable punch press or the like to create outwardly bent louvers 20 of any desirable form, but which, for purposes of illustration, are shown as being substantially rectangular in elevation. The magnitude of the opening provided between the louver and the sheet is calculated to be sufficiently small to prevent flies, mosquitos, and other comparable insects from making their way through such openings, without unduly restricting flow of air through the ventilator. The number of louvers per square inch of surface of sheet 19 and their specific arrangement relative to one another is such as to provide the maximum area of opening through the sheet 19 consistent with providing the sheet with adequate strength to withstand the most severe forces to which it will be subjected by weather conditions.

For a reason to be hereinafter described, louvers 20 are sloped outwardly and upwardly from the outer surface of the louver sheet 19 rather than downwardly as is generally considered necessary to provide maximum weather protection.

Direct access to opening 15 to rain, snow, or the like, is barred by a circular cover 21 which is curved downwardly over its central regions, the downward curvature becoming increasingly marked toward the edge regions of the cover to terminate in a cylindrical region 22 near the periphery of the cover. A shoulder 23 is formed at the edge regions of the cover to lend said cover stiffness.

Figure 2:
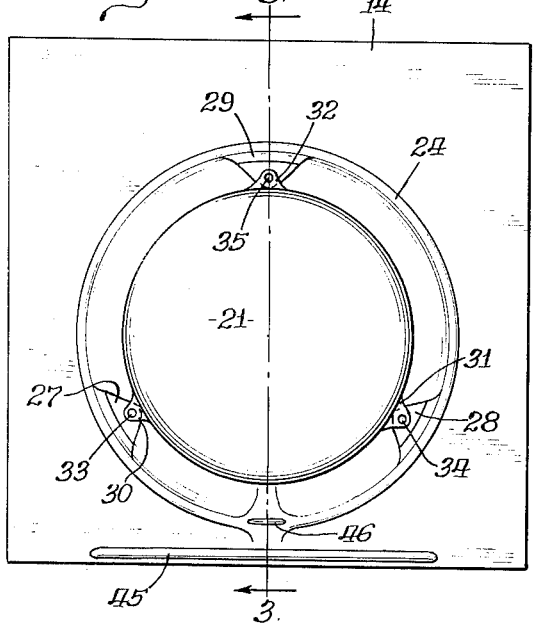
FIG. 2 is a plan view of the ventilator itself on an enlarged scale.

Surrounding edge regions 23 of cover 21 and extending outwardly from the surface of base sheet 14 is a baffle ring 24. Said baffle ring 24 has a frusto conical outer surface 25 and a smoothly rounded inner surface 26, the curvature of which begins at the outermost region of baffle 24 and continues until it becomes tangent to the upper surface of base sheet 14. The inner surface 26 of baffle ring 24 is interrupted (FIG. 2) at 27, 28, and 29, to form substantially triangular radially inwardly extending bosses on which rest radially outwardly extending tabs 30, 31, and 32, respectively, formed integrally with the peripheral regions of cover 21. Said cover 21 is permanently secured to the bosses 27, 28, and 29, by rivets 33, 34, and 35, respectively.

It is contemplated that the dimensions of cover 21, particularly the dimensions of the cylindrical region 22 and shoulder 23 will be such that when cover 21 is securely riveted to the bosses 27, 28, and 29, the louver-containing sheet 19 will be clamped between said cover 21 and base sheet 14 around shoulder 18, and thus will require no fastener to hold it in place in the ventilator.

The principle of operation underlying the design of the ventilator hereinabove described, and the manner in which it is incorporated in the ventilator, will now be detailed.

Figure 5:
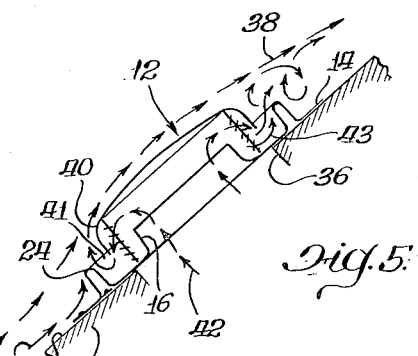
FIG. 5 is a diagrammatic representation of the louver of this invention as applied to a sloping roof and showing the air currents created therethrough by an exterior air stream moving parallel with the plane of the roof surface.

Referring to FIG. 5, the ventilator 12 is shown secured to the roof 11 over an opening 36 therein. The roof is pitched so that the ventilator is disposed at an angle to the horizontal. For purposes of illustration, it will be assumed that there is a movement of air substantially parallel to the surface 37 of roof 11 and in an upward direction along said roof. Such movement will be created by a wind moving substantially horizontally along the ground and striking the roof 11 so that it is deflected by the roof in a manner to cause it to flow along the roof surface. The moving air stream is depicted by a series of arrows 38 and 39. As the air stream created by the wind strikes baffle ring 24, it will be deflected upwardly where it next strikes the curved portion 40 of cover 21. There it will be given an additional upward deflection and will be caused to follow the general curvature of the cover 21. The deflection of the air currents upwardly away from the general surface 37 of roof 11 creates a negative pressure in the space 41 between shoulder 23 on cover 21 and the smoothly rounded inner surface 26 of baffle ring 24. This negative pressure creates a pressure differential between the said space 41 and the interior of the upwardly extending flange 16 defining opening 15 which is effective to cause a movement of air through said opening 15 and through the openings adjacent louvers 20 around the shoulder 23 at the peripheral regions of cover 21 into the space 41 and then out to join the air stream 38. This movement of air from the attic regions is depicted by the series of arrows shown at 42.

Considering the trailing regions of cover 21, the moving air stream 38 will tend to move in a straight line and will therefore move away from the curved cover 21, thereby again creating a negative pressure which is effective to initiate a movement of air from the attic region through the opening 15, through the openings adjacent louvers 20 and outwardly through the space between peripheral regions 23 on cover 21 and the baffle ring 24, as depicted by the arrows 43. As the air moves outwardly through the ventilator 12 to join the airstream 38, some turbulence will be created, but it will have no material affect on the continuous outward movement of air through the ventilator.

It may be observed that for the effective creation of the negative pressure in the annular space between cover 21 and baffle ring 24, said cover should extend within the baffle ring as shown more clearly in FIG. 3, so that air moving parallel to the base sheet 14 will not readily turn inwardly and move directly toward the louver-containing sheet 19 rather than upwardly over cover 21 as shown in FIG. 5. It may likewise be apparent that for a smooth outward flow of air around the peripheral regions 23 of cover 21 it is highly desirable that inner surface 26 of the baffle ring 24 be smoothly rounded and in fact constitute a continuous radius extending from base sheet 14 to substantially the outermost regions of the baffle ring 24, thus to prevent the creation of eddy pockets which would impede the outward movement of the air.

It is a basic requirement of ventilators that they be weatherproof and that they do not create any harmful conditions in the structure to which they are attached. One of the most difficult weather conditions to contend with in a ventilator is a hard-driven rain. In the present design a hard-driven rain can strike the smoothly rounded inner surface 26 and be deflected upwardly against the louver containing sheet 19. If the louvers 20 were slanted outwardly and downwardly, as is the customary disposition of such louvers, the upwardly deflected hard-driven rain would easily move past the louvers and into the adjacent openings in the sheet. The louvers of the present design, therefore, are disposed to extend outwardly and upwardly, rather than downwardly, and hence present substantially a flat surface to the deflected rain which repels the rain and causes it to fall backward into the space between baffle ring 24 and flange 16.

Figure 4:
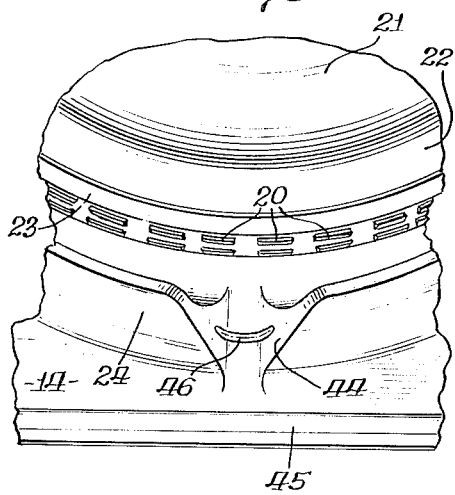
FIG. 4 is a fragmentary perspective view looking down upon the ventilator of FIG. 3.

Rain may, of course, enter freely the space 41 between cover 21 and baffle ring 24, either directly as it falls, or as runoff from cover 21. Where the hard-driven rain strikes the upper portion of the ventilator (either space 41 or cover 21) when the ventilator is mounted on a pitched roof as shown in FIG. 5, it runs downwardly against flange 16 and then around said flange and out through the openings adjacent louvers 20 to the bottom inner portion of baffle ring 24. At this point (as shown in FIG. 4) a notch 44 is formed in ring 24 through which the collected rain may flow to the exterior of said ring 24 and upon base sheet 14. It is undesirable, however, to have the collected rain flow in a concentrated stream along any portion of the roof surface 37 because of the cumulative destructive force of such stream. To obviate this difficulty a relatively low bead 45 is formed near the lower edge of base sheet 14 in the path of the stream issuing through notch 44 and extending to both sides of said notch by which the stream is widened and its destructive force is dissipated.

It is contemplated, because of the several curved surfaces required for the successful operation of the ventilator and for a reduction in the cost of the ventilator, but as many parts as possible be made by a molding process. Thus cover 21 and base sheet 14, which are the two principal parts responsible for the creation of the negative pressure by a moving air stream are molded from a plastic material which is weather resistant but which, nevertheless, will retain its shape. It has been found that relatively thin material will be adequately strong for the forces involved, with the possible exception of the portion weakened by the formation of notch 44 in baffle ring 24. Additional strength at this point, however, is achieved by the formation of a second bead 46 connecting the two walls of the notch 44 and lending stiffness to the sheet at that point. Because of the molding operation, the walls of flange 16 are tapered as shown so as to provide the necessary draw in the mold. A similar taper is formed on the outside of ring 24 which, however, not only assists in withdrawing the base sheet 14 from its mold but also provides a sloping wall against which the moving air stream 37 may flow and be deflected outwardly without the creation of excessive turbulence.

In any building or structure which rises from the ground into a wind, certain areas of negative pressure will, naturally, be created over the surfaces of the structure. The negative pressure areas, however, are not necessarily coextensive with the surfaces of the structure so that other areas of the surfaces may have a positive pressure created thereon by the moving wind. Because of the disposition of rooms, beams, joists, chimneys, or other portions of a structure, it sometimes becomes necessary to place a ventilator on the surface of a structure which is normally under positive pressure by a moving windstream. Such positions are generally undesirable and any average ventilator when so located will necessarily be only partially effective. The present ventilator, however, is markedly effective in such areas since the negative pressure created by the moving air stream becomes more negative the stronger the stream becomes. The present design, therefore, is relatively free of wind pressure and direction and can be located on a structure at whatever point is determined to be the best for the disposition of the walls, beams, or rooms, etc., within the structure. In comparative tests made with a ventilator designed according to the present invention and one designed according to conventional methods, it was found that the present ventilator had an air flow equal to that of the conventional ventilator when both were operating within a negative pressure area. It had a substantial air flow at other locations where conventional roof ventilators had very limited effectiveness. When located at the most unfavorable roof locations the present ventilator had a flow of air equal to 40% of the maximum of which it was capable. In these unfavorable locations the performance of the present ventilator was from 66% to 85% better than the conventional ventilators.

It is understood that the foregoing description is merely illustrative of a preferred embodiment of the invention and that the scope of the invention therefore is not to be limited thereto but is to be determined by the appended claims.

I claim:

1. A roof ventilator comprising a base sheet adapted to be secured to a roof in coplanar relation thereto, said sheet and roof having substantially aligned openings of regular geometric form therethrough, a flange around said base sheet opening and extending upwardly of said sheet, a cover for the opening in the base sheet disposed above said flange and having edges turned downwardly toward the base sheet, means for securing the cover to the sheet in spaced relation thereto, and a fold in the bare sheet encircling the opening and extending outwardly from the base sheet across the space between the cover and base sheet to form a baffle, said fold being laterally spaced from and extending outwardly beyond the edges of the cover to provide a passage for air from the base sheet opening around the cover to the exterior of the ventilator.

2. A ventilator as described in claim 1, said cover having a convex outer surface, and said cover having additionally edge regions which are turned down toward the base sheet between the fold and the flange in overlapping relation to the baffle.

3. A roof ventilator as described in claim 1, said flange having a shoulder, and a louvered sheet centered on said shoulder and disposed between the base sheet and cover around the flange in the base sheet and spaced inwardly of the edges of the cover.

4. A roof ventilator as described in claim 1, and a louvered sheet disposed between the base sheet and cover around the flange in the base sheet, the louvers in said sheet extending outwardly and upwardly from the louvered sheet.

5. A roof ventilator as described in claim 1, said means for securing the cover to the sheet comprising areas in the base sheet between the baffle-forming fold and the flange formed into bosses extending outwardly from the base sheet, ears on the cover overlying the bosses, and fastener means securing the ears to the bosses.

6. a roof ventilator as described in claim 1, said flange having a shoulder, said ventilator further comprising a louvered sheet rolled to a cylindrical form and disposed between the base and cover around the flange in the base, with one circular edge of the louvered sheet bearing against the shoulder and the other circular edge bearing against the cover.

7. A roof ventilator as described in claim 1 said opening in the base sheet being defined by an upwardly extending flange, which prevents rainwater from flowing into said opening and said baffle having a notch therein disposed in the lowermost region of the baffle when said ventilator is installed on a pitched roof, whereby rain collecting within the baffle may drain out of the baffle, and means on the base sheet in the path of the rain water flowing out of the baffle to spread the water and thereby reduce the concentration of the stream issuing from said notch.

8. A roof ventilator comprising a base sheet adapted to be secured to a pitched roof in coplanar relation thereto, said sheet and roof having substantially aligned openings therethrough, a cover for the opening in the base sheet, said cover having a convex upper surface and edge regions extending downwardly toward said base sheet, a louvered sheet interposed between the cover and base sheet inwardly of the edge regions of the cover, said louvered sheet having a cylindrical form and encircling the opening in said base sheet, the louvers on said louvered sheet extending upwardly and outwardly from said louvered sheet, a raised shoulder on the base sheet on which the lower edge region of the louvered sheet is centered, outwardly extending attaching tabs on the cover, bosses on the base sheet under the attaching tabs, fastener means securing the attaching tabs to the bosses, an upwardly extending flange defining the opening in the base sheet, said flange extending into the louvered sheet, a baffle on the base sheet radially spaced from and encircling the downwardly extending edge regions of the cover, said baffle extending upwardly from the base sheet beyond the edge regions of the cover, said baffle having a notch therein on the lowermost side of said baffle through which rain water collected in the baffle may flow, and a bead on the base sheet below the notch and extending transversely of the direction of flow of rain water to disperse said flow, said baffle creating a negative pressure between the baffle and edge regions of the cover when an air stream is directed at the ventilator in a direction substantially parallel with the plane of the base sheet, whereby air is drawn through the roof opening, the opening in the base sheet, through the louvered sheet, around the edge of the cover and into the space between the baffle and the cover to join the said air stream directed at the ventilator.

9. A roof ventilator comprising a base sheet adapted to be secured to a roof in coplanar relation thereto, said sheet and roof having substantially aligned openings, a cover for the opening in the sheet, a flange around the opening in the sheet and extending upwardly toward said cover, a centering shoulder on the flange, means for securing the cover to the sheet in spaced relation thereto, a louvered sheet within said cover contacting the cover and centering shoulder, a baffle spaced laterally from the cover and extending upwardly from the base sheet at least in part across the perpendicular distance between the cover and sheet to deflect wind upwardly toward and over said cover, and a bead extending upwardly from the base sheet and longitudinally thereof between one outer edge of the base sheet and the baffle.

10. A roof ventilator comprising a base sheet adapted to be secured to a roof in coplanar relation thereto, said sheet and roof having substantially aligned openings, a cover for the opening in the sheet, means for supporting the cover from the sheet in spaced relation thereto, and a baffle spaced laterally from the cover and extending upwardly from the base sheet at least in part across the space between the cover and sheet, said cover being curved downwardly from the central region thereof toward the base sheet and extending beyond the edge of the opening in the base sheet, a flange extending upwardly from the sheet under said cover and defining the opening in said sheet, said baffle having upwardly converging outer and inner surfaces for structural rigidity.

11. A roof ventilator comprising a base sheet adapted to be secured to a roof in coplanar relation thereto, said sheet and roof having substantially aligned openings, a cover disposed over the opening in the sheet, and means on the base for supporting the cover from the sheet in spaced relation thereto, said sheet being formed with an upwardly directed fold spaced laterally from the cover and extending at least in part across the space between the cover and sheet to form a baffle which is integral with the sheet and which deflects wind upwardly toward and over said cover.

12. A roof ventilator as described in claim 11, said fold having a gap therein and said sheet extending upwardly at the gap across the ends of said fold to prevent spreading thereof.

References Cited by the Examiner

UNITED STATES PATENTS

| | | | |
|---|---|---|---|
| 1,860,367 | 5/1932 | Peverley | 98—42 |
| 2,379,638 | 7/1945 | Hughes | 98—20 X |
| 2,628,551 | 2/1953 | Leigh | 98—42 |

WILLIAM F. O'DEA, *Primary Examiner.*

JOHN F. O'CONNOR, *Examiner.*